(12) United States Patent
Hashim et al.

(10) Patent No.: US 11,795,815 B2
(45) Date of Patent: Oct. 24, 2023

(54) NON-INTRUSIVE WELLHEAD SEAL MONITORING

(71) Applicant: Saudi Arabian Oil Company, Dhahran (SA)

(72) Inventors: Abdulrhman Hashim, Dammam (SA); Mohammed Mukhlifi, Dammam (SA); Mohammed Muqri, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 360 days.

(21) Appl. No.: 17/165,006

(22) Filed: Feb. 2, 2021

(65) Prior Publication Data

US 2022/0243585 A1     Aug. 4, 2022

(51) Int. Cl.
| | |
|---|---|
| *E21B 47/117* | (2012.01) |
| *G01M 3/22* | (2006.01) |
| *E21B 47/002* | (2012.01) |
| *E21B 33/03* | (2006.01) |
| *G01M 3/28* | (2006.01) |
| *G01M 3/04* | (2006.01) |

(52) U.S. Cl.
CPC ............ *E21B 47/117* (2020.05); *E21B 33/03* (2013.01); *E21B 47/0025* (2020.05); *G01M 3/223* (2013.01); *G01M 3/2853* (2013.01); *G01M 3/045* (2013.01)

(58) Field of Classification Search
CPC ......... G01M 3/24; G01M 3/243; E21B 33/03; E21B 47/0025; E21B 47/107; E21B 47/117
See application file for complete search history.

(56) References Cited

U.S. PATENT DOCUMENTS

| | | | |
|---|---|---|---|
| 4,202,410 A | * | 5/1980 | Quebe ..................... E21B 33/04 |
| | | | 166/88.4 |
| 5,548,530 A | | 8/1996 | Baumoel |
| 6,595,038 B2 | | 7/2003 | Williams et al. |
| 8,336,620 B2 | | 12/2012 | Williams et al. |
| 10,107,061 B2 | | 10/2018 | Stephens et al. |
| 10,451,760 B2 | | 10/2019 | Haugen et al. |
| 2017/0372196 A1 | * | 12/2017 | Traidia ..................... G06N 3/08 |
| 2018/0230797 A1 | | 8/2018 | Seshadri et al. |
| 2019/0128113 A1 | | 5/2019 | Ross et al. |

FOREIGN PATENT DOCUMENTS

WO    2016149334 A1    9/2016

* cited by examiner

*Primary Examiner* — Erika J. Villaluna
(74) *Attorney, Agent, or Firm* — Bracewell LLP; Constance G. Rhebergen; Brian H. Tompkins (57) ABSTRACT

Provided are techniques for operating a hydrocarbon well system that include installing a wellhead seal assembly at a wellhead of a hydrocarbon well system, conducting pressure testing of a wellhead seal cavity defined by the seal assembly to verify its integrity, disposing a control fluid into the wellhead seal cavity, conducting baseline ultrasonic imaging of the wellhead seal cavity to generate a baseline ultrasonic image that depicts a signature of the control fluid disposed in the wellhead seal cavity at a first point in time, conducting updated ultrasonic imaging of the wellhead seal cavity to generate an updated ultrasonic image that depicts a signature of substances disposed in the wellhead seal cavity at a second point in time, comparing the updated ultrasonic image to the baseline ultrasonic image to determine whether the integrity of the wellhead seal cavity has been compromised.

20 Claims, 5 Drawing Sheets

NON-INTRUSIVE WELLHEAD SEAL MONITORING

FIELD

Embodiments relate generally to developing wells, and more particularly to monitoring seals of hydrocarbon wells.

BACKGROUND

A well typically includes a wellbore (or a "borehole") that is drilled into the Earth to provide access to a geologic formation that resides below the Earth's surface (or a "subsurface formation"). A well may facilitate the extraction of natural resources, such as hydrocarbons and water, from a subsurface formation, facilitate the injection of substances into the subsurface formation, or facilitate the evaluation and monitoring of the subsurface formation. In the petroleum industry, hydrocarbon wells are often drilled to extract (or "produce") hydrocarbons, such as oil and gas, from subsurface formations.

Developing a hydrocarbon well for production typically involves several stages, including drilling, completion and production stages. The drilling stage involves drilling a wellbore into a portion of the formation that is expected to contain hydrocarbons (often referred to as a "hydrocarbon reservoir" or a "reservoir"). The drilling process is often facilitated by a drilling rig that sits at the Earth's surface to facilitate a variety of drilling operations, such as operating a drill bit to cut the wellbore. The completion stage involves operations for making the well ready to produce hydrocarbons, such as installing casing, production tubing and valves for regulating production flow, and pumping substances into the well to fracture, clean or otherwise prepare the reservoir and well to produce hydrocarbons. The production stage involves producing hydrocarbons from the reservoir by way of the well. During the production stage, the drilling rig is typically replaced with a production tree that includes valves that are operable to, for example, to regulate pressure in the wellbore, to regulate production flow from the wellbore, or to provide access to the wellbore. The production tree of a well is typically coupled to a wellhead of the well and routes production to a distribution network of midstream facilities, such as tanks, pipelines or transport vehicles that transport production from the well to downstream facilities, such as refineries or export terminals.

The various stages of developing a hydrocarbon well can include a variety of challenges that are addressed to successfully develop the well. For example, during production operations, a well operator typically monitors and controls various aspects of the well system to optimize the overall production of hydrocarbons from the reservoir. In many instances, this involves monitoring the integrity of seals and other portions of the well system.

SUMMARY

Monitoring, control and maintenance of a hydrocarbon well can be an important aspect of effectively and efficiently developing a hydrocarbon well. For example, valves, seals and conduits can be important for regulating, isolating and directing the flow of wellbore fluids, such as production. Components of hydrocarbon wells, such as well production trees and associated valves, typically include sealing elements that provide barrier to inhibit the passage of substances between different regions within the well system. For example, a ring shaped wellhead seal assembly may be disposed between the interior of a wellhead body and the exterior of tubular casing pipe to provide a seal that inhibits the flow of fluids between the annular region surrounding the casing and a production conduit formed by the interior of the casing pipe and a passage within the wellhead. This can inhibit comingling of the fluid in the annular region with production fluid traveling in the production conduit.

Unfortunately, seals can be compromised, which can led to undesired leaks between regions. In an effort to identify seal leakage and limit the effects thereof, many well operators engage in regular seal inspection operations. This typically involves physical disassembly of one or more well components to access and inspect a seal or regions isolated by the seal. For example, in the context of a wellhead seal, an operator may open a seal access port to physically access and visually inspect a wellhead seal assembly. If this type of assessment is not conclusive or otherwise sufficient, the wellhead may need to be removed and the wellhead seal assembly disassembled for further inspection. This can require a considerable amount of time and effort, and can create additional safety issues. For example, in a typical wellhead seal inspection, well production operations may be suspended, well personnel may engage in complex disassembly and reassembly procedures, and well personnel and the atmosphere may be exposed to hydrocarbons (which is even more likely when the seal assembly has failed).

Provided in some embodiment is a non-intrusive technique for evaluating seal integrity. In some embodiments, ultrasonic signals are used to evaluate internal seals of a wellhead, such as a wellhead seal assembly that is disposed between well casing and a wellhead body. Upon successful installation of a wellhead and a wellhead seal assembly, the wellhead seal assembly integrity is verified by way of pressure testing, the associated wellhead seal cavity is filled with a control fluid (e.g., a fluid having characteristics that are different than the wellbore fluids expected to be isolated by the wellhead seal assembly), and ultrasonic imaging of the wellhead seal assembly is conducted (e.g., by way ultrasonic transducers distributed about an exterior surface of the wellhead) to generate a baseline ultrasonic image that corresponds to the uncompromised wellhead seal assembly. Accordingly, the baseline image may include the ultrasonic signature of the "pure" control fluid that is present in the wellhead seal cavity, before other substances have an opportunity to invade the wellhead seal cavity. Then, in a subsequent seal evaluation operation (e.g., hours, days, weeks, months or years following the acquisition of the baseline ultrasonic image), an updated ultrasonic imaging of the wellhead seal assembly is conducted (e.g., by way of ultrasonic transducers distributed about an exterior surface of the wellhead) to generate a an "updated" ultrasonic image that corresponds to the current state of wellhead seal assembly, including an ultrasonic signature of substance(s) that are currently present in the wellhead seal cavity. For example, the updated ultrasonic image may include the ultrasonic signature of the control fluid and/or other substances that are present in the wellhead seal cavity, such as a mixture of the control fluid and production fluid that has invaded the wellhead seal cavity. The updated ultrasonic image is then assessed to determine the current state of the wellhead seal assembly, and subsequent operations are conducted based on the assessment. For example, the updated ultrasonic image may be compared to the baseline ultrasonic image (e.g., by way of image subtraction to identify differences there between) to determine whether the ultrasonic characteristics of the fluid currently present in the wellhead seal cavity is consistent with the ultrasonic characteristics of the control fluid originally present in the wellhead seal cavity. If so, it may be determined that the wellhead seal assembly has not been compromised and is functioning properly (e.g., the wellhead seal assembly is not leaking). If not, it may be determined that the wellhead seal assembly has been compromised and is not functioning properly (e.g., the wellhead seal assembly is leaking). In response to determining the that the wellhead seal assembly has not been compromised, a subsequent seal evaluation operation may be scheduled for, or be conducted at, a later time (e.g., a day, week, month or year following the acquisition of the updated ultrasonic image). In response to determining the that the wellhead seal assembly has been compromised, a wellhead seal assembly remediation operation (e.g., a repair or a replacement of the wellhead seal assembly) may be scheduled and conducted.

Provided in some embodiments is a method of operating a hydrocarbon well system, the method including: installing a wellhead seal assembly at a wellhead of a hydrocarbon well system; conducting pressure testing of a wellhead seal cavity defined by the wellhead seal assembly to verify integrity of the wellhead seal assembly; verifying, based on the pressure testing of the wellhead, the integrity of the wellhead seal assembly at a first point in time; in response to verifying the integrity of the wellhead seal assembly at the first point in time: disposing a control fluid into the wellhead seal cavity; and conducting baseline ultrasonic imaging of the wellhead seal cavity to generate a baseline ultrasonic image that depicts a signature of the control fluid disposed in the wellhead seal cavity at the first point in time; conducting, at a second point in time that is subsequent to the first point in time, updated ultrasonic imaging of the wellhead seal cavity to generate an updated ultrasonic image that depicts a signature of substances disposed in the wellhead seal cavity at the second point in time; comparing the updated ultrasonic image to the baseline ultrasonic image to determine whether the integrity of the wellhead seal cavity has been compromised; and determining, based on the comparison of the updated ultrasonic image to the baseline ultrasonic image, that the integrity of the wellhead seal cavity has been compromised.

In some embodiments, determining that the integrity of the wellhead seal cavity has been compromised includes determining that the wellhead seal cavity includes a substance other than the control fluid. In certain embodiments, the method further includes: in response to determining that the wellhead seal cavity includes a substance other than the control fluid, determining that the integrity of the wellhead seal cavity has been compromised; and operating, in response to determining that the integrity of the wellhead seal cavity has been compromised, the hydrocarbon well in accordance with the wellhead seal cavity being compromised. In some embodiments, operating the hydrocarbon well in accordance with the wellhead seal cavity being compromised includes conducting a remediation operation to repair or replace the wellhead seal assembly. In certain embodiments, operating the hydrocarbon well in accordance with the wellhead seal cavity being compromised includes modifying a production parameter of the hydrocarbon well. In some embodiments, the ultrasonic imaging of the wellhead seal cavity includes activating an ultrasonic transducer coupled to an exterior of a body of the wellhead to generate an ultrasonic signal that is transmitted through the body of the wellhead and into the wellhead seal cavity. In certain embodiments, the method further includes: conducting, at a third point in time that is subsequent to the first point in time and prior to the second point in time, second updated ultrasonic imaging of the wellhead seal cavity to generate a second updated ultrasonic image that depicts a signature of substances disposed in the wellhead seal cavity at the third point in time; comparing the second updated ultrasonic image to the baseline ultrasonic image to determine whether the integrity of the wellhead seal cavity has been compromised at the third point in time; and determining, based on the comparison of the second updated ultrasonic image to the baseline ultrasonic image, that the integrity of the wellhead seal cavity has not been compromised at the third point in time.

Provided in some embodiments is a hydrocarbon well system that includes: a wellhead assembly including: a wellhead body including a wellhead seal seat; a wellhead seal assembly adapted to be disposed in the wellhead seal seat to define a wellhead seal cavity that is filled with a control fluid; and a wellhead seal monitoring system adapted to perform the following operations: conduct, at a first point that is subsequent to the filling of the seal cavity with the control fluid, baseline ultrasonic imaging of the wellhead seal cavity to generate a baseline ultrasonic image that depicts a signature of the control fluid disposed in the wellhead seal cavity at the first point in time; conduct an updated seal integrity test operation including: conducting, at a second point in time that is subsequent to the first point in time, updated ultrasonic imaging of the wellhead seal cavity to generate an updated ultrasonic image that depicts a signature of substances disposed in the wellhead seal cavity at the second point in time; compare the updated ultrasonic image to the baseline ultrasonic image to determine whether the integrity of the wellhead seal cavity has been compromised; and determine, based on the comparison of the updated ultrasonic image to the baseline ultrasonic image, that the integrity of the wellhead seal cavity has been compromised.

In some embodiments, determining that the integrity of the wellhead seal cavity has been compromised includes determining that the wellhead seal cavity includes a substance other than the control fluid. In certain embodiments, the operations further include: in response to determining that the wellhead seal cavity includes a substance other than the control fluid, determining that the integrity of the wellhead seal cavity has been compromised; and operating, in response to determining that the integrity of the wellhead seal cavity has been compromised, the hydrocarbon well in accordance with the wellhead seal cavity being compromised. In some embodiments, operating the hydrocarbon well in accordance with the wellhead seal cavity being compromised includes prompting a remediation operation to repair or replace the wellhead seal assembly. In certain embodiments, operating the hydrocarbon well in accordance with the wellhead seal cavity being compromised includes modifying a production parameter of the hydrocarbon well. In some embodiments, the wellhead assembly includes an ultrasonic transducer coupled to an exterior of a body of the wellhead, and the ultrasonic imaging of the wellhead seal cavity includes activating the ultrasonic transducer to generate an ultrasonic signal that is transmitted through the body of the wellhead and into the wellhead seal cavity. In certain embodiments, the operations further include: conducting, at a third point in time that is subsequent to the first point in time and prior to the second point in time, second updated ultrasonic imaging of the wellhead seal cavity to generate a second updated ultrasonic image that depicts a signature of substances disposed in the wellhead seal cavity at the third point in time; comparing the second updated ultrasonic image to the baseline ultrasonic image to determine whether the integrity of the wellhead seal cavity has been compromised at the third point in time; and determining, based on the comparison of the second updated ultrasonic image to the baseline ultrasonic image, that the integrity of the wellhead seal cavity has not been compromised at the third point in time.

Provided in some embodiments is a non-transitory computer readable storage medium including program instructions stored thereon that are executable by a processor to perform the following operations for operating a hydrocarbon well including a wellhead assembly including a wellhead body including a wellhead seal seat and a wellhead seal assembly disposed in the wellhead seal seat to define a wellhead seal cavity that is filled with a control fluid: conduct, at a first point that is subsequent to the filling of the seal cavity with the control fluid, baseline ultrasonic imaging of the wellhead seal cavity to generate a baseline ultrasonic image that depicts a signature of the control fluid disposed in the wellhead seal cavity at the first point in time; conduct an updated seal integrity test operation including: conducting, at a second point in time that is subsequent to the first point in time, updated ultrasonic imaging of the wellhead seal cavity to generate an updated ultrasonic image that depicts a signature of substances disposed in the wellhead seal cavity at the second point in time; compare the updated ultrasonic image to the baseline ultrasonic image to determine whether the integrity of the wellhead seal cavity has been compromised; and determine, based on the comparison of the updated ultrasonic image to the baseline ultrasonic image, that the integrity of the wellhead seal cavity has been compromised.

In some embodiments, determining that the integrity of the wellhead seal cavity has been compromised includes determining that the wellhead seal cavity includes a substance other than the control fluid. In certain embodiments, the operations further include: in response to determining that the wellhead seal cavity includes a substance other than the control fluid, determining that the integrity of the wellhead seal cavity has been compromised; and operating, in response to determining that the integrity of the wellhead seal cavity has been compromised, the hydrocarbon well in accordance with the wellhead seal cavity being compromised. In some embodiments, operating the hydrocarbon well in accordance with the wellhead seal cavity being compromised includes prompting a remediation operation to repair or replace the wellhead seal assembly, or operating the hydrocarbon well in accordance with the wellhead seal cavity being compromised includes modifying a production parameter of the hydrocarbon well. In certain embodiments, the wellhead assembly includes an ultrasonic transducer coupled to an exterior of a body of the wellhead, and the ultrasonic imaging of the wellhead seal cavity includes activating the ultrasonic transducer to generate an ultrasonic signal that is transmitted through the body of the wellhead and into the wellhead seal cavity. In some embodiments, the operations further include: conducting, at a third point in time that is subsequent to the first point in time and prior to the second point in time, second updated ultrasonic imaging of the wellhead seal cavity to generate a second updated ultrasonic image that depicts a signature of substances disposed in the wellhead seal cavity at the third point in time; comparing the second updated ultrasonic image to the baseline ultrasonic image to determine whether the integrity of the wellhead seal cavity has been compromised at the third point in time; and determining, based on the comparison of the second updated ultrasonic image to the baseline ultrasonic image, that the integrity of the wellhead seal cavity has not been compromised at the third point in time.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the scope of the present disclosure as defined by the claims.

DETAILED DESCRIPTION

Described are embodiments of novel systems and methods for evaluating seal integrity. In some embodiments, ultrasonic signals are used to evaluate internal seals of a wellhead, such as a wellhead seal assembly that is disposed between well casing and a wellhead body. Upon successful installation of a wellhead and a wellhead seal assembly, the wellhead seal assembly integrity is verified by way of pressure testing, the associated wellhead seal cavity is filled with a control fluid (e.g., a fluid having characteristics that are different than the wellbore fluids expected to be isolated by the wellhead seal assembly), and ultrasonic imaging of the wellhead seal assembly is conducted (e.g., by way ultrasonic transducers distributed about an exterior surface of the wellhead) to generate a baseline ultrasonic image that corresponds to the uncompromised wellhead seal assembly. Accordingly, the baseline image may include the ultrasonic signature of the "pure" control fluid that is present in the wellhead seal cavity, before other substances have an opportunity to invade the wellhead seal cavity. Then, in a subsequent seal evaluation operation (e.g., hours, days, weeks, months or years following the acquisition of the baseline ultrasonic image), an updated ultrasonic imaging of the wellhead seal assembly is conducted (e.g., by way of ultrasonic transducers distributed about an exterior surface of the wellhead) to generate a an "updated" ultrasonic image that corresponds to the current state of wellhead seal assembly, including an ultrasonic signature of substance(s) that are currently present in the wellhead seal cavity. For example, the updated ultrasonic image may include the ultrasonic signature of the control fluid and/or other substances that are present in the wellhead seal cavity, such as a mixture of the control fluid and production fluid that has invaded the wellhead seal cavity. The updated ultrasonic image is then assessed to determine the current state of the wellhead seal assembly, and subsequent operations are conducted based on the assessment. For example, the updated ultrasonic image may be compared to the baseline ultrasonic image (e.g., by way of image subtraction to identify differences there between) to determine whether the ultrasonic characteristics of the fluid currently present in the wellhead seal cavity is consistent with the ultrasonic characteristics of the control fluid originally present in the wellhead seal cavity. If so, it may be determined that the wellhead seal assembly has not been compromised and is functioning properly (e.g., the wellhead seal assembly is not leaking). If not, it may be determined that the wellhead seal assembly has been compromised and is not functioning properly (e.g., the wellhead seal assembly is leaking). In response to determining the that the wellhead seal assembly has not been compromised, a subsequent seal evaluation operation may be scheduled for, or be conducted at, a later time (e.g., a day, week, month or year following the acquisition of the updated ultrasonic image). In response to determining the that the wellhead seal assembly has been compromised, a wellhead seal assembly remediation operation (e.g., a repair or a replacement of the wellhead seal assembly) may be scheduled and conducted.

Figure 1:
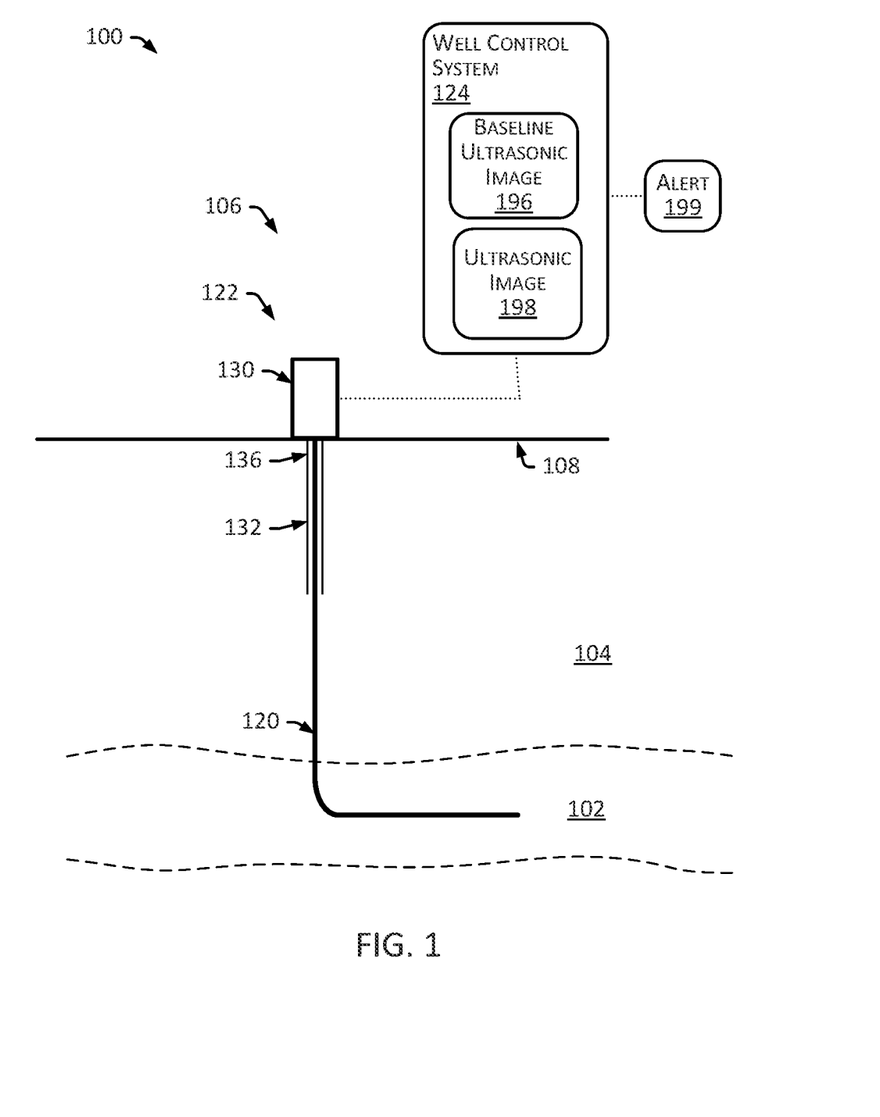
FIG. 1 is diagram that illustrates a well environment in accordance with one or more embodiments.

FIG. 1 is a diagram that illustrates a well environment 100 in accordance with one or more embodiments. In the illustrated embodiment, the well environment 100 includes a reservoir ("reservoir") 102 located in a subsurface formation ("formation") 104 and a well system ("well") 106.

The formation 104 may include a porous or fractured rock formation that resides beneath the Earth's surface (or "surface") 108. The reservoir 102 may be a hydrocarbon reservoir defined by a portion of the formation 104 that contains (or that is determined or expected to contain) a subsurface pool of hydrocarbons, such as oil and gas. The formation 104 and the reservoir 102 may each include different layers of rock having varying characteristics, such as varying degrees of permeability, porosity and fluid saturation. In the case of the well 106 being operated as a production well, the well 106 may be a hydrocarbon production well that is operable to facilitate the extraction of hydrocarbons (or "production"), such as oil and gas, from the reservoir 102.

In some embodiments, the well 106 includes a wellbore and systems for extracting production by way of the wellbore. For example, in the illustrated embodiment, the well 106 includes a wellbore 120, a production system 122 and a well control system ("control system") 124. The wellbore 120 may be, for example, a bored hole that extends from the surface 108 into a target zone of the formation 104, such as the reservoir 102. The wellbore 120 may be created, for example, by a drill bit boring through the formation 104 and the reservoir 102. An upper end of the wellbore 120 (e.g., the end of the wellbore 120 located at or near the surface 108) may be referred to as the "up-hole" end of the wellbore 120. A lower end of the wellbore 120 (e.g., terminating in the formation 104) may be referred to as the "down-hole" end of the wellbore 120.

In some embodiments, the production system 122 includes devices that facilitate extraction of production from the reservoir 102 by way of the wellbore 120. For example, in the illustrated embodiment, the production system 122 includes a wellhead 130 that is operable to regulate fluid pressure and flow in the wellbore 120. In some embodiments, the wellhead 130 is operable to contain and regulate the pressure and flow of fluids in the regions defined by a wellbore casing tubular disposed in the wellbore 120. For example, in the illustrated embodiment, the wellhead 130 (located at the surface 108) is coupled to an up-hole end 136 of a wellbore casing tubular (or "casing") 132 that extends into an upper portion of the wellbore 120. The wellhead 130 may include various passages and valves that can be used to regulate the flow of substances in and around the casing 132 or other tubulars disposed in the wellbore 120.

Figure 2:
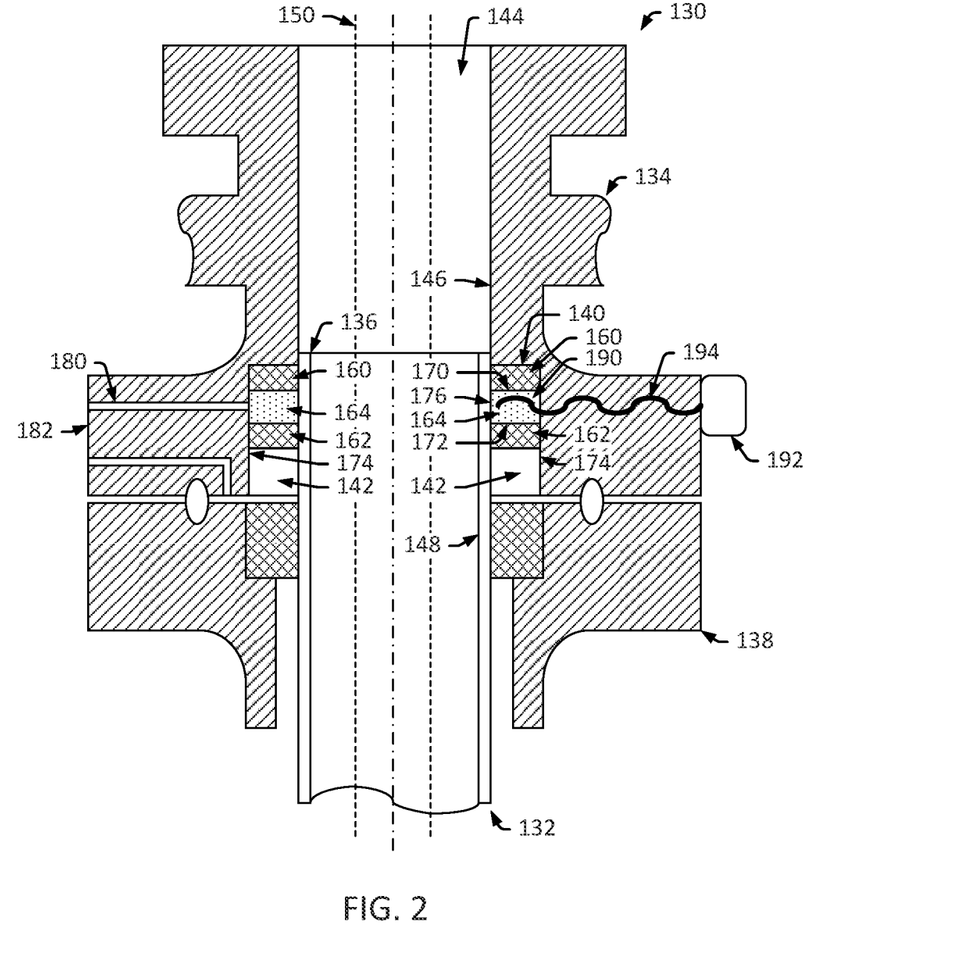
FIG. 2 is a diagram that illustrates a wellhead system in accordance with one or more embodiments.

FIG. 2 is a diagram that illustrates the wellhead 130 in accordance with one or more embodiments. In the illustrated embodiment, the wellhead 130 include a wellhead body 134 that is disposed about the up-hole end 136 of the casing 132, and is coupled to a casing head 138 disposed about an upper portion of the casing 132. A wellhead seal assembly ("wellhead seal") 140 is disposed in a seal recess 142 of the wellhead body 134 to provide a seal between the periphery of the casing 132 and the wellhead body 134. The resulting seal may provide fluid isolation between the region surrounding the casing 132 and the internal conduit 144 defined by the interior of the upper portion 146 of the wellhead body 134 and the interior surface 148 of the casing 132. In some embodiments, a tubular 150 (such as production tubing) is disposed inside the internal conduit 144, and the seal provides fluid isolation between the region surrounding the casing 132 and the annular region located between the exterior surface of the tubular 150 and the walls of the wellhead body 134 and the casing 132 that define the internal conduit 144.

In some embodiments, the wellhead seal 140 includes one or more sealing members that define a wellhead seal cavity. For example, in the illustrated embodiment, the wellhead seal 140 includes an upper seal ring 160 and a lower seal ring 162 that, when installed, define wellhead seal cavity 164 there between. The wellhead seal cavity 164 may, for example, be an annular region defined by a lower face 170 of the upper seal ring 160, an upper face 172 of the lower seal ring 162, an interior surface 174 of the seal recess 142 of the wellhead body 134, and an exterior surface 176 of the casing 132.

In some embodiments, the wellhead 130 includes an access port that provides fluid communication with the wellhead seal cavity. For example, in the illustrated embodiment, the wellhead body 134 includes a wellhead seal access port 180 defined by a passage that extends through the wellhead body 134 (from an exterior face 182 of the wellhead body 134 and through the interior surface 174 of the seal recess 142 of the wellhead body 134).

In some embodiments, the wellhead seal access port 180 enables pressure testing of the wellhead seal assembly. For example, after installation of the wellhead 130 and the wellhead seal 140 about the up-hole end 136 of the casing 132, a pressurized substance, such as a gas or liquid, may be injected or otherwise introduced into to the wellhead seal cavity 164 by way of the wellhead seal access port 180. In such an embodiment, the pressure of the substance may be monitored (e.g., by way of a pressure sensor coupled to the wellhead seal access port 180) to verify the integrity of the wellhead seal 140. A steady hold of pressure may indicate that the wellhead seal 140 is not leaking. A pressure fall-off may indicate that the wellhead seal 140 is leaking. For example, it may be determined that the wellhead seal 140 is performing appropriately (and its integrity may be verified) responsive to monitoring and assessment revealing that the wellhead seal cavity 164 held at least a given pressure over a prescribed duration of time. In contrast, it may be determined that the wellhead seal 140 is not performing appropriately (and its integrity may not be verified) responsive to monitoring and assessment revealing that the wellhead seal cavity 164 did not hold at least the given pressure over the prescribed duration of time.

In some embodiments, the wellhead seal access port 180 enables introduction of a control fluid into the wellhead seal cavity. For example, after installation of the wellhead 130 and pressure testing of the wellhead seal 140, the wellhead seal cavity 164 may be filled with a control fluid 190 that is introduced by way of the wellhead seal access port 180. The wellhead seal access port 180 may be closed to retain the control fluid 190 within the wellhead seal cavity 164. As described here, the wellhead seal cavity 164 may be subjected to ultrasonic imaging over time to generate ultrasonic images that are indicative of characteristics of substance(s) contained in the wellhead seal cavity 164 at different points in time (e.g., over days, weeks months or years), and the images may be compared to determine if and when a foreign substance, such as wellbore fluid, has invaded the wellhead seal cavity 164, which can indicate a compromise of the wellhead seal 140. In some embodiments, the control fluid 190 is a fluid that has ultrasonic characteristics that are different from those of wellbore fluids expected to be present in the wellbore 120 or within the interior 148 of casing 132. For example, the control fluid 190 may be a synthetic-based hydraulic fluid, a water-based hydraulic fluid, or a mineral-based hydraulic fluid. This may enable ultrasonic imaging to detect the invasion of the control fluid 190 by wellbore fluid or other fluids having ultrasonic signatures different that are different from the control fluid 190.

In some embodiments, the production system 122 includes one or more wellhead seal cavity sensors that are operable to sense characteristics of substances contained in the wellhead seal cavity 164. For example, in the illustrated embodiment, the production system 122 includes a wellhead seal cavity ultrasonic sensor 192 that is disposed on an exterior of the wellhead body 134. In some embodiments, ultrasonic sensor 192 is an ultrasonic transducer having a transmitter that is capable of generating ultrasonic signals and a receiver capable of sensing (or "receiving") reflections of the ultrasonic signal. During operation, a transmitter of the ultrasonic sensor 192 may be activated to transmit ultrasonic signals 194 that are directed into the wellhead seal cavity 164. Reflections of the ultrasonic signals 194 may be sensed by a receiver of the ultrasonic sensor 192, and characteristics of the received signals may be used to generate an ultrasonic image of substances (such as the control fluid 190 or other substances) contained in the wellhead seal cavity 164. Although a single wellhead seal cavity ultrasonic sensor 194 is depicted and discussed in certain embodiments for the purpose of explanation, multiple sensors may be employed. In some embodiments, a plurality of wellhead seal cavity ultrasonic sensors may be disposed about the periphery of the wellhead body 134 surrounding the wellhead seal cavity 164. For example, eight ultrasonic sensors 192 may be disposed in a horizontal plane, about every 45 degrees around the periphery of the wellhead body 134 surrounding the wellhead seal cavity 164). The use of multiple sensors may enable ultrasonic imaging of a larger volume of the wellhead seal cavity 164.

In some embodiments, non-intrusive seal performance evaluation includes the following: (1) installing the wellhead seal 140 at wellhead 130 of the hydrocarbon well 106; (2) conducting pressure testing of the wellhead seal 140 to verify integrity of the wellhead seal assembly 140; (3) responsive to verification of the integrity of the wellhead seal 140, filling the wellhead seal cavity 164 with the control fluid 190; (4) conducting "baseline" ultrasonic imaging of the wellhead seal cavity 164 (e.g., by way of ultrasonic signals 194 generated by the ultrasonic sensors 192 distributed about the periphery of the wellhead body 134 surrounding the wellhead seal cavity 164) to generate a "baseline" ultrasonic image 196 that corresponds the ultrasonic signature of the control fluid 190 that is present in the wellhead seal cavity 164 at a first point in time ($t_0$) (e.g., within hours of installing the wellhead seal 140 at wellhead 130); (5) conducting, at a later point in time ($t_2$) (e.g., a time that is hours, days, weeks, or months after the "baseline" ultrasonic imaging of the wellhead seal cavity 164), "updated" ultrasonic imaging of the wellhead seal cavity 164 to generate an "updated" ultrasonic image 198 that corresponds to the ultrasonic signature of fluid that is currently present in the seal cavity at the later point in time ($t_2$); (6) assessing the "updated" ultrasonic image (e.g., by way of comparing the "updated" ultrasonic image 198 to the "baseline" ultrasonic image 196 to determine whether the ultrasonic characteristics of the fluid present in the wellhead seal cavity 164 are consistent with the ultrasonic characteristics of the control fluid 190) to determine a "current" state of the wellhead seal 140, including whether or not the wellhead seal 140 has been compromised; and operating the well 106 based on the results of the assessment. This may include, for example, conducting "follow-up" wellhead seal assembly monitoring or remediation operations based on the results of the assessment. For example, this may include, in response to determining the that the wellhead seal 140 has not been compromised, scheduling and conducting a subsequent seal evaluation operation that includes repeating steps (4), (5) and (6) a next later point in time ($t_3$)). As another example, this may include, in response to determining the that the wellhead seal assembly has been compromised, scheduling and conducting a wellhead seal remediation operation that includes inspection, repair or replacement of the wellhead seal 140. In some embodiments, an alert 199 is sent based on the outcome of the assessment. For example, in response to determining the that the wellhead seal assembly has not been compromised, the well control system 124 may transmit an alert 199 indicating a need to schedule and conduct a next updated ultrasonic imaging of the wellhead seal cavity 164, and may add the next updated ultrasonic imaging of the wellhead seal cavity 164 to a schedule of operations to be completed for the well 106. As a further example, in response to determining the that the wellhead seal assembly has been compromised, the well control system 124 may transmit an alert indicating a need to schedule and conduct the wellhead seal remediation operation, and may add the wellhead seal remediation operation to a schedule of operations to be completed for the well 106.

Figure 3:
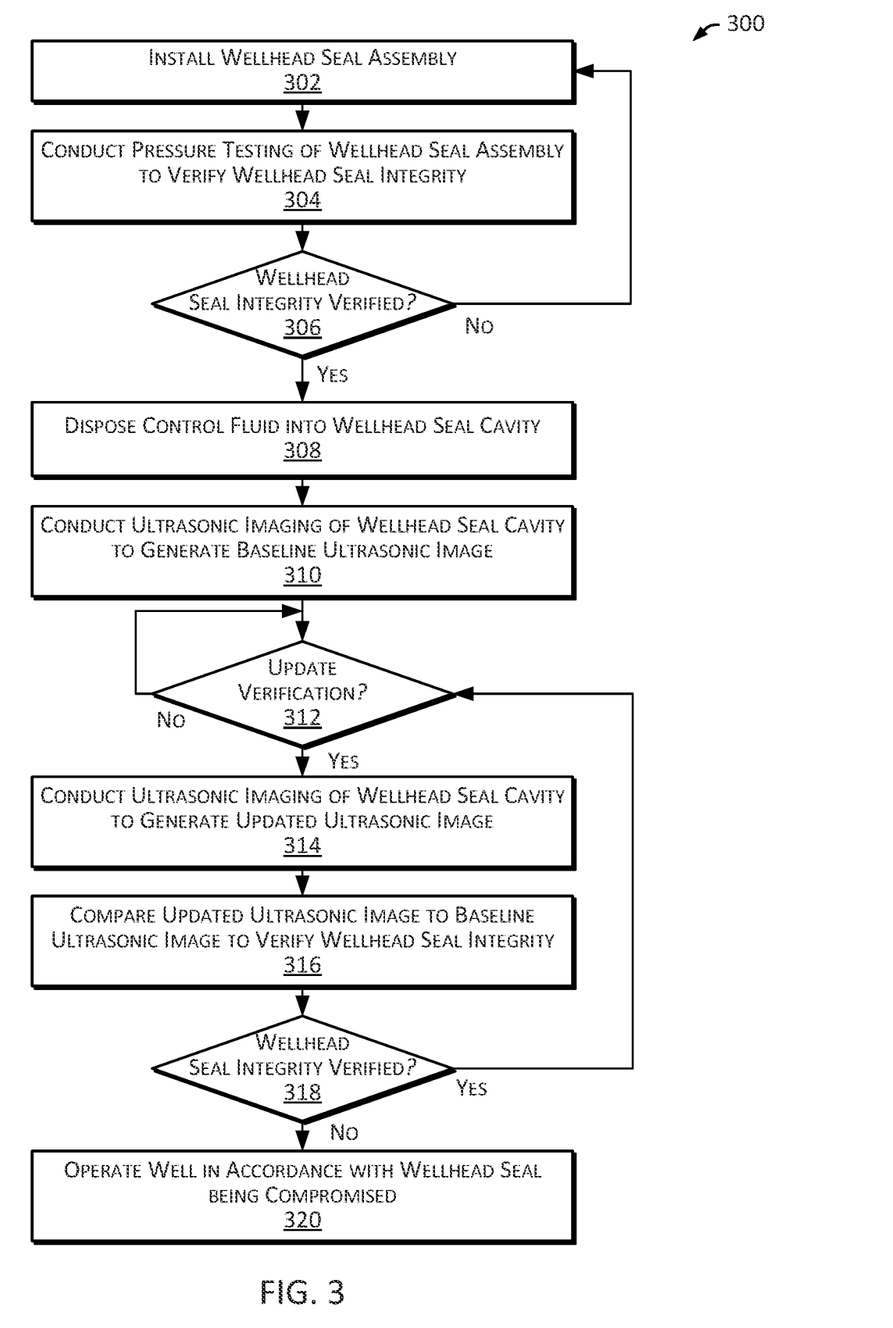
FIG. 3 is a flowchart that illustrates a method of monitoring and operating a well in accordance with one or more embodiments.

FIG. 3 is a flowchart that illustrates a method of monitoring and operating a hydrocarbon well in accordance with one or more embodiments. In the context of the well 106, some or all of the operations of method 300 may be performed by the well control system 124, well personnel, or another operator of the well 106.

In some embodiments, method 300 includes installing a wellhead seal assembly (block 302). This may include a installing a wellhead onto a casing, with a wellhead seal assembly seated in place to provide a seal between a body of the wellhead and the periphery of the casing. For example, installing a wellhead seal assembly may include well personnel seating the wellhead seal 140 into the seal recess 142 of the wellhead body 134, and installing the wellhead 130 (e.g., with wellhead seal 140 already seated in the in the seal recess 142) onto the up-hole end 136 of the casing 132, such that the wellhead seal 140 is installed to provide a fluid seal between the interior surface 174 of the seal recess 142 of the wellhead body 134 and the exterior surface 176 of the casing 132.

In some embodiments, method 300 includes conducting pressure testing of the wellhead seal assembly to verify integrity of the wellhead seal assembly (block 304). This may include introducing a pressurized fluid into the wellhead seal cavity and assessing the pressure response to verify performance of the wellhead seal assembly. For example, conducting pressure testing of the wellhead seal assembly to verify integrity of the wellhead seal assembly may include well personnel introducing a pressurized substance, such as a gas or liquid, into to the wellhead seal cavity 164 by way of the wellhead seal access port 180 (e.g., after installation of the wellhead 130 and the wellhead seal 140 about the up-hole end of the casing tubular 136, injecting a gas or liquid into the wellhead seal access port 180), and the well control system 124 monitoring and assessing the pressure of the substance (e.g., by way of a pressure sensor coupled to the wellhead seal access port 180) to verify performance of the wellhead seal 140. A steady hold of pressure may indicate that the wellhead seal 140 is not leaking. A pressure fall-off may indicate that the wellhead seal 140 is leaking. For example, the well control system 124 may determine that the wellhead seal 140 is performing appropriately (and its integrity may be verified) responsive to monitoring and assessment revealing that the wellhead seal cavity 164 held at least a given pressure over a prescribed duration of time. In contrast, the well control system 124 may determine that the wellhead seal 140 is not performing appropriately (and its integrity may not be verified) responsive to monitoring and assessment revealing that the wellhead seal cavity 164 did not hold at least the given pressure over the prescribed duration of time.

In some embodiments, method 300 includes (responsive to a failure to verify the integrity of the wellhead seal assembly) proceeding to removal and re-installation of the wellhead and the wellhead seal assembly (block 302). In some embodiments, method 300 includes (responsive to verification of the integrity of the wellhead seal assembly) disposing a control fluid in the wellhead seal cavity (block 308). This may include well personnel filling the wellhead cavity with a control fluid that has ultrasonic characteristics that are different from those of wellbore fluids or other substances expected to be present in the wellbore and casing. For example, disposing a control fluid in the wellhead seal cavity may include, filling the wellhead seal cavity 164 with a control fluid 190 (e.g., a synthetic-based hydraulic fluid, a water-based hydraulic fluid, or a mineral-based hydraulic fluid) that is introduced by way of the wellhead seal access port 180. In some embodiments, the wellhead seal cavity 164 is completely filled with the control fluid 190, and the wellhead seal access port 180 is closed to retain the control fluid 190 within the wellhead seal cavity 164.

Figure 4A:
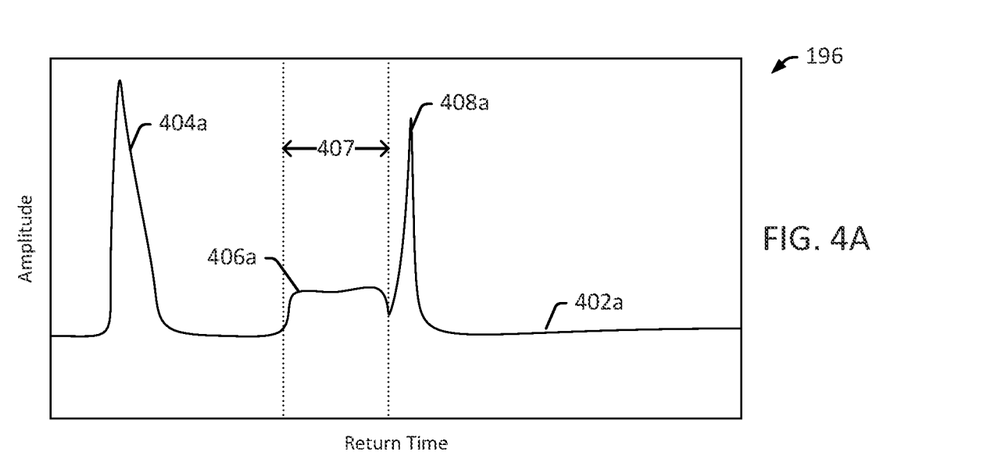
FIGS. 4A-4C are diagrams that illustrate ultrasonic images in accordance with one or more embodiments.

In some embodiments, method 300 includes conducting baseline ultrasonic imaging of the wellhead seal cavity (block 310). This may include conducting ultrasonic imaging of the wellhead seal cavity at a first point in time ($t_0$) to generate a baseline ultrasonic image that depicts a signature of the control fluid disposed in the wellhead seal cavity at a first point in time ($t_0$). The first point in time ($t_0$) may be, for example, prior to the wellhead seal assembly being exposed to an external pressure that could compromise its integrity. For example, conducting baseline ultrasonic imaging of the wellhead seal cavity may include, after the control fluid is introduced into the wellhead seal cavity 164 and before the wellhead 130 is operated to generate an elevated wellhead pressure (e.g., above about 100 psi) in the central conduit 144, the well control system 124 operating the ultrasonic transducer(s) 192 distributed about the periphery of the wellhead body 134 of the wellhead seal cavity 164 to transmit ultrasonic signals 194 and sense reflections thereof, and using the sensed signals to generate a baseline ultrasonic image 196 that corresponds the ultrasonic signature of the control fluid 190 that is present in the wellhead seal cavity 164 at the first point in time ($t_0$). The first point in time ($t_0$) may be, for example, within an hour, a day or a week of disposing the control fluid 190 in the wellhead seal cavity 164. In some embodiments, the operation of the ultrasonic transducer(s) 192 may include the well control system 124 activating the ultrasonic transducer(s) 192 to generate the ultrasonic signals 194 that are directed through the wellhead body 134 and into the control fluid 190 disposed in the wellhead seal cavity 164, and to sense ultrasonic reflections of the ultrasonic signals 194. The well control system 124 may, in turn, use the sensed ultrasonic reflections to generate the baseline ultrasonic image 196 that depicts the signature of the control fluid 190 disposed in the wellhead seal cavity 164 at the first point in time ($t_0$). FIG. 4A is a diagram that illustrates an example baseline ultrasonic image 196 in accordance with one or more embodiments. The baseline ultrasonic image 196 depicts a curve 402a that represents the amplitude of reflections sensed versus a return time (which corresponds to a delay between the transmission of the "source" ultrasonic signal 194 and the sensing of the corresponding reflections). In the illustrated embodiment, the first peak in amplitude 404a of the curve 402a may be attributable to reflections from the wellhead body 194, the second peak/plateau in amplitude 406a of the curve 402a (across a return time range 407) may be attributable to reflections from the control fluid 190 in the wellhead seal cavity 164, and the third peak in amplitude 408a of the curve 402a may be attributable to reflections from the casing 132. In some embodiments, the ultrasonic image 196 may be generated based on signals sensed by a single ultrasonic sensor 192, and a similar ultrasonic image 196 may be generated for each ultrasonic sensor 192 employed about the periphery of the wellhead body 134.

In some embodiments, method 300 includes determining whether an updated verification of the wellhead seal integrity is needed (block 312). This may include determining whether a given duration of time has passed or the well has been operated in a manner that may have compromised the wellhead seal since the prior verification. For example, if the integrity of the wellhead seal 140 is to be verified each year, and it is has been more than one year since the last verification of the integrity of the wellhead seal 140, it may be determined that a updated verification of the integrity of the wellhead seal 140 is needed. As a further example, if the wellhead seal integrity is to be verified following operation of the well 106 at a wellbore pressure greater than 10,000 psi, and the well 106 was recently operated at a wellbore pressure of 15,000 psi (and no updated verification of the integrity of the wellhead seal 140 has since been conducted), it may be determined that a updated verification of the integrity of the wellhead seal 140 is needed.

Figure 4B:
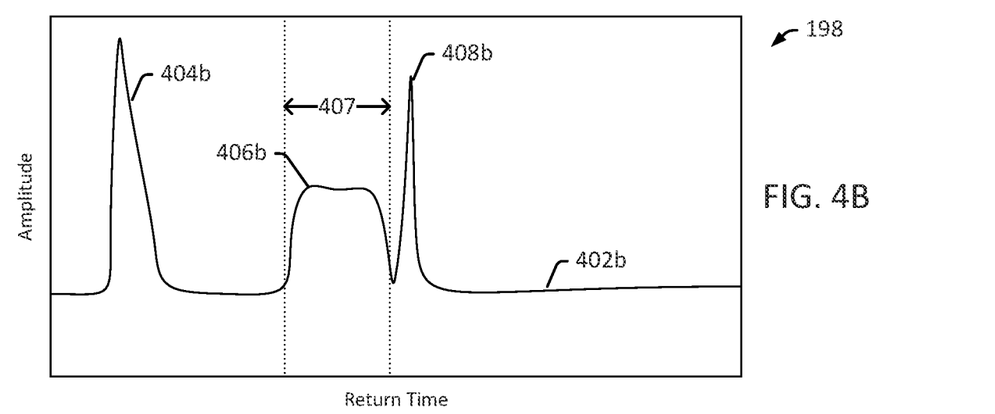

In some embodiments, method 300 includes (responsive to determining that a updated verification of the integrity of the wellhead seal 140 is needed) conducting updated ultrasonic imaging of the wellhead seal cavity (block 314). This may include conducting updated ultrasonic imaging of the wellhead seal cavity at a second point in time ($t_1$) to generate an updated ultrasonic image that depicts a signature of the substance(s) (e.g., control fluid, wellbore fluid, another foreign substance, or a mixture thereof) disposed in the wellhead seal cavity at the second point in time ($t_1$). The second point in time ($t_1$) may be, for example, hours, days, weeks, months or years after the first point in time ($t_0$). For example, conducting updated ultrasonic imaging of the wellhead seal cavity may include, responsive to the well control system 124 determining that is has be more than one year since the last verification of the integrity of the wellhead seal 140 (or that the well 106 has been operated with wellbore pressure greater than 10,000 psi), the well control system 124 operating the ultrasonic transducer(s) 192 distributed about the periphery of the wellhead body 134 of the wellhead seal cavity 164) to transmit ultrasonic signals 194 and sense reflections thereof, and using the sensed signals to generate an updated ultrasonic image 198 that corresponds the ultrasonic signature of the substance(s) (e.g., the control fluid 190, wellbore fluid, another foreign substance, or a mixture thereof) disposed in the wellhead seal cavity 164 at the second point in time ($t_1$). In some embodiments, the operation of the ultrasonic transducer(s) 192 includes the well control system 124 activating the ultrasonic transducer(s) 192 to generate the ultrasonic signals 194 that are directed through the wellhead body 134 and into the control fluid 190 disposed in the wellhead seal cavity 164, and to sense ultrasonic reflections of the ultrasonic signals 194. The well control system 124 may, in turn, use the sensed ultrasonic reflections to generate the updated ultrasonic image 198 that depicts the signature of the substance(s) disposed in the wellhead seal cavity 164 at the second point in time ($t_1$). FIG. 4B is a diagram that illustrates an example updated ultrasonic image 198 in accordance with one or more embodiments. The updated ultrasonic image 198 depicts a curve 402b that represents the amplitude of reflections sensed versus a return time. In the illustrated embodiment, the first peak in amplitude 404b of the curve 402b may be attributable to reflections from the wellhead body 194, the second peak/plateau in amplitude 406b of the curve 402b (across a return time range 407) may be attributable to reflections from the control fluid 190 in the wellhead seal cavity 164, and the third peak in amplitude 408b of the curve 402b may be attributable to reflections from the casing 132. In some embodiments, the ultrasonic image 198 may be generated based on signals sensed by a single ultrasonic sensor 192, and a similar ultrasonic image 198 may be generated for each ultrasonic sensor 192 employed about the periphery of the wellhead body 134.

In some embodiments, method 300 includes comparing the updated ultrasonic image to the baseline ultrasonic image to verify integrity of the wellhead seal (block 316). This may include comparing the updated ultrasonic image that depicts a signature of the substance(s) (e.g., control fluid, wellbore fluid, another foreign substance, or a mixture thereof) disposed in the wellhead seal cavity at the second point in time ($t_1$) to the baseline ultrasonic image that depicts a signature of the control fluid disposed in the wellhead seal cavity at the first point in time ($t_0$) to determine whether similarities or differences between the images signify that the wellhead seal has maintained its integrity or that the wellhead seal has been compromised and, thus, lost its integrity. For example, comparing the updated ultrasonic image to the baseline ultrasonic image to verify integrity of the wellhead seal may include the well control system 124 conducting a subtraction of the baseline ultrasonic image 196 from the updated ultrasonic image 198 (or vice versa), and determining whether the difference in the region corresponding to reflections from the wellhead seal cavity 164 (and substances contained therein) is substantial enough to indicate that the control fluid 190 has been invaded by another substance, which indicates a compromise of the wellhead seal 140. For example, if the difference is at or above a difference threshold, it may be determined that the integrity of the wellhead seal 140 has been compromised (e.g., a substance has invaded the wellhead seal cavity 164), and the integrity of the wellhead seal 140 may not be verified. In contrast, if the difference is below the difference threshold, it may be determined that the integrity of the wellhead seal 140 has not been compromised (e.g., the wellhead seal cavity 164 is filled with the control fluid 190), and the integrity of the wellhead seal 140 may be verified.

Figure 4C:
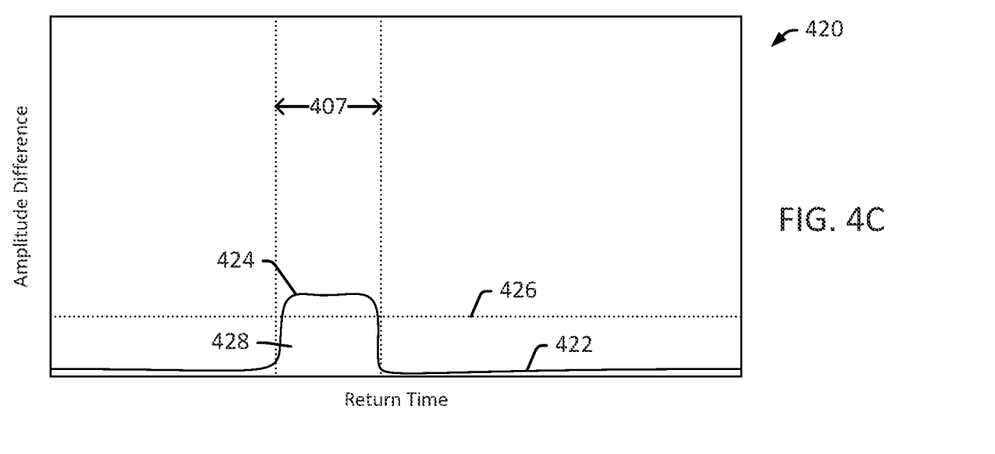

FIG. 4C is a diagram that illustrates an example subtracted ultrasonic image 420 in accordance with one or more embodiments. The subtracted ultrasonic image 420 depicts a curve 422 that represents a difference between the amplitude of the curves 402a and 402b of FIGS. 4A and 4B. In the illustrated embodiment, the peak/plateau in amplitude 424 of the curve 402b (across the return time range 407) may be attributable to differences between ultrasonic reflections generated by the control fluid 190 present in the wellhead seal cavity 164 at the first point in time ($t_1$) and ultrasonic reflections generated by the substance(s) (e.g., control fluid, wellbore fluid, another foreign substance, or a mixture thereof) disposed in the wellhead seal cavity 164 at the second point in time ($t_1$). In some embodiments, the determination of the integrity of the wellhead seal may be based on the amplitude of at least some of the portion of the curve corresponding to the wellhead seal cavity exceeding a difference threshold. For example, in the illustrated embodiment, it may be determined that the integrity of the wellhead seal 140 has been compromised (e.g., a substance has invaded the wellhead seal cavity 164), and the integrity of the wellhead seal 140 may not be verified, based on the peak/plateau in amplitude 424 exceeding a difference threshold 426. In some embodiments, the determination of the integrity of the wellhead seal may be based on the area of the portion of the curve corresponding to the wellhead seal cavity exceeding a difference threshold defined by an amplitude value. For example, in the illustrated embodiment, it may be determined that the integrity of the wellhead seal 140 has been compromised (e.g., a substance has invaded the wellhead seal cavity 164), and the integrity of the wellhead seal 140 may not be verified, based on the peak/plateau in amplitude 424 defining an area 428 that exceeds a difference threshold defined by an area. In some embodiments, the comparison is based on a comparison of the ultrasonic images 196 and 198 generated for a given ultrasonic sensor 192, and a similar comparison can be made for the pairs of images 196 and 198 generated by each ultrasonic sensor 192 employed about the periphery of the wellhead body 134.

In some embodiments, method 300 includes (responsive to determining that the integrity of the wellhead seal is verified (block 318)) returning to determining whether an updated verification of the wellhead seal integrity is needed (block 312). In some embodiments, method 300 includes (responsive to determining that the integrity of the wellhead seal is not verified (block 318)) proceeding to operate the well in accordance with the wellhead seal being compromised (block 320). This may include the well control system 124 (or another well operator) controlling production parameters in accordance with the wellhead seal being compromised, or scheduling and conducting a wellhead seal remediation operation. Controlling production parameters in accordance with the wellhead seal being compromised may include, for example, reducing an operating pressure or flowrate of the well 106. Scheduling and conducting a wellhead seal remediation operation may include the well control system 124 (or another well operator) scheduling and conducting a wellhead seal remediation operation that includes inspection, repair or replacement of the wellhead seal cavity 164. For example, in response to determining that the integrity of the wellhead seal 140 is not verified, the well control system 124 may transmit (to well personnel) an alert 199 (e.g., a written, visual or audible alert) indicating a need to schedule and conduct a remediation operation for the wellhead seal 140, and may add the remediation operation for the wellhead seal 140 to a schedule of operations to be completed for the well 106. Well personnel may complete the remediation operation in accordance with the schedule or alert 199.

Figure 5:
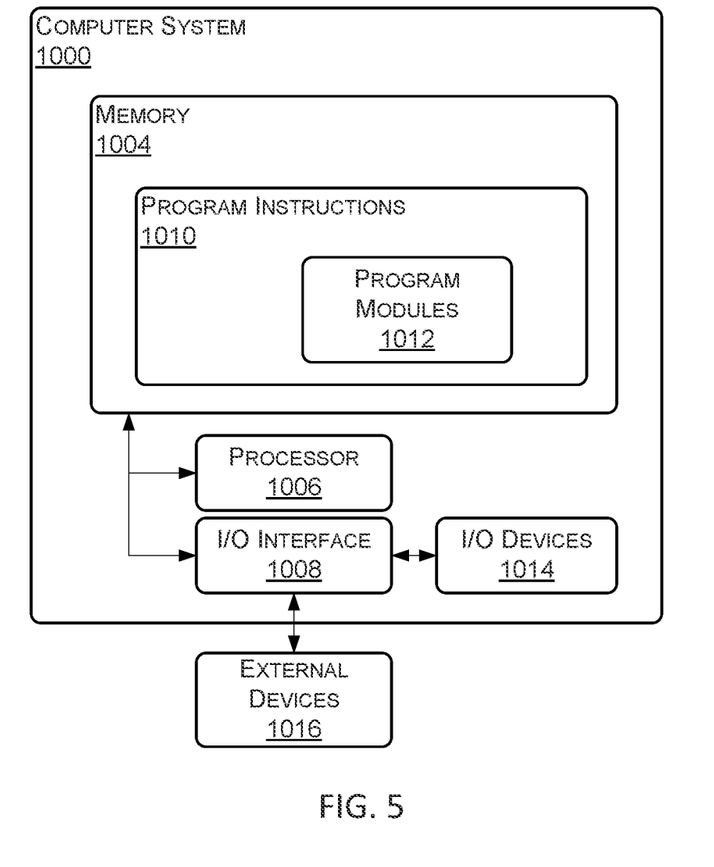
FIG. 5 is a diagram that illustrates an example computer system in accordance with one or more embodiments.

FIG. 5 is a diagram that illustrates an example computer system (or "system") 1000 in accordance with one or more embodiments. The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored thereon. The program instructions 1010 may include program modules 1012 that are executable by a computer processor (e.g., the processor 1006) to cause the functional operations described here, such as those described with regard to the well control system 124 (or another operator of the well 106) or the method 300.

The processor 1006 may be any suitable processor capable of executing program instructions. The processor 1006 may include a central processing unit (CPU) that carries out program instructions (e.g., the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (e.g., an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016. In some embodiments, the I/O interface 1008 includes one or both of an antenna and a transceiver. The external devices 1016 may include, for example, the ultrasonic sensor(s) 192.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (that is, meaning having the potential to), rather than the mandatory sense (that is, meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (for example, by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of operating a hydrocarbon well system, the method comprising:

installing a wellhead seal assembly at a wellhead of a hydrocarbon well system;

conducting pressure testing of a wellhead seal cavity defined by the wellhead seal assembly to verify integrity of the wellhead seal assembly;

verifying, based on the pressure testing of the wellhead, the integrity of the wellhead seal assembly at a first point in time;

in response to verifying the integrity of the wellhead seal assembly at the first point in time:

disposing a control fluid into the wellhead seal cavity; and conducting baseline ultrasonic imaging of the wellhead seal cavity to generate a baseline ultrasonic image that depicts a signature of the control fluid disposed in the wellhead seal cavity at the first point in time;

conducting, at a second point in time that is subsequent to the first point in time, updated ultrasonic imaging of the wellhead seal cavity to generate an updated ultrasonic image that depicts a signature of substances disposed in the wellhead seal cavity at the second point in time;

comparing the updated ultrasonic image to the baseline ultrasonic image to determine whether the integrity of the wellhead seal cavity has been compromised; and determining, based on the comparison of the updated ultrasonic image to the baseline ultrasonic image, that the integrity of the wellhead seal cavity has been compromised.

2. The method of claim 1, wherein determining that the integrity of the wellhead seal cavity has been compromised comprises determining that the wellhead seal cavity comprises a substance other than the control fluid.

3. The method of claim 1, further comprising:
in response to determining that the wellhead seal cavity comprises a substance other than the control fluid, determining that the integrity of the wellhead seal cavity has been compromised; and
operating, in response to determining that the integrity of the wellhead seal cavity has been compromised, the hydrocarbon well in accordance with the wellhead seal cavity being compromised.

4. The method of claim 3, wherein operating the hydrocarbon well in accordance with the wellhead seal cavity being compromised comprises conducting a remediation operation to repair or replace the wellhead seal assembly.

5. The method of claim 3, wherein operating the hydrocarbon well in accordance with the wellhead seal cavity being compromised comprises modifying a production parameter of the hydrocarbon well.

6. The method of claim 1, wherein the ultrasonic imaging of the wellhead seal cavity comprises:
activating an ultrasonic transducer coupled to an exterior of a body of the wellhead to generate an ultrasonic signal that is transmitted through the body of the wellhead and into the wellhead seal cavity.

7. The method of claim 1, further comprising:
conducting, at a third point in time that is subsequent to the first point in time and prior to the second point in time, second updated ultrasonic imaging of the wellhead seal cavity to generate a second updated ultrasonic image that depicts a signature of substances disposed in the wellhead seal cavity at the third point in time;
comparing the second updated ultrasonic image to the baseline ultrasonic image to determine whether the integrity of the wellhead seal cavity has been compromised at the third point in time; and
determining, based on the comparison of the second updated ultrasonic image to the baseline ultrasonic image, that the integrity of the wellhead seal cavity has not been compromised at the third point in time.

8. A hydrocarbon well system comprising:
a wellhead assembly comprising:
a wellhead body comprising a wellhead seal seat;
a wellhead seal assembly configured to be disposed in the wellhead seal seat to define a wellhead seal cavity that is filled with a control fluid; and
a wellhead seal monitoring system configured to perform the following operations:
conduct, at a first point that is subsequent to the filling of the seal cavity with the control fluid, baseline ultrasonic imaging of the wellhead seal cavity to generate a baseline ultrasonic image that depicts a signature of the control fluid disposed in the wellhead seal cavity at the first point in time;
conduct an updated seal integrity test operation comprising:
conducting, at a second point in time that is subsequent to the first point in time, updated ultrasonic imaging of the wellhead seal cavity to generate an updated ultrasonic image that depicts a signature of substances disposed in the wellhead seal cavity at the second point in time;
compare the updated ultrasonic image to the baseline ultrasonic image to determine whether the integrity of the wellhead seal cavity has been compromised; and
determine, based on the comparison of the updated ultrasonic image to the baseline ultrasonic image, that the integrity of the wellhead seal cavity has been compromised.

9. The system of claim 8, wherein determining that the integrity of the wellhead seal cavity has been compromised comprises determining that the wellhead seal cavity comprises a substance other than the control fluid.

10. The system of claim 8, the operations further comprising:
in response to determining that the wellhead seal cavity comprises a substance other than the control fluid, determining that the integrity of the wellhead seal cavity has been compromised; and
operating, in response to determining that the integrity of the wellhead seal cavity has been compromised, the hydrocarbon well in accordance with the wellhead seal cavity being compromised.

11. The system of claim 10, wherein operating the hydrocarbon well in accordance with the wellhead seal cavity being compromised comprises prompting a remediation operation to repair or replace the wellhead seal assembly.

12. The system of claim 10, wherein operating the hydrocarbon well in accordance with the wellhead seal cavity being compromised comprises modifying a production parameter of the hydrocarbon well.

13. The system of claim 8,
wherein the wellhead assembly comprises an ultrasonic transducer coupled to an exterior of a body of the wellhead, and
wherein the ultrasonic imaging of the wellhead seal cavity comprises activating the ultrasonic transducer to generate an ultrasonic signal that is transmitted through the body of the wellhead and into the wellhead seal cavity.

14. The system of claim 8, the operations further comprising:
conducting, at a third point in time that is subsequent to the first point in time and prior to the second point in time, second updated ultrasonic imaging of the wellhead seal cavity to generate a second updated ultrasonic image that depicts a signature of substances disposed in the wellhead seal cavity at the third point in time;
comparing the second updated ultrasonic image to the baseline ultrasonic image to determine whether the integrity of the wellhead seal cavity has been compromised at the third point in time; and
determining, based on the comparison of the second updated ultrasonic image to the baseline ultrasonic image, that the integrity of the wellhead seal cavity has not been compromised at the third point in time.

15. A non-transitory computer readable storage medium comprising program instructions stored thereon that are executable by a processor to perform the following operations for operating a hydrocarbon well comprising a wellhead assembly comprising a wellhead body comprising a wellhead seal seat and a wellhead seal assembly disposed in the wellhead seal seat to define a wellhead seal cavity that is filled with a control fluid:

conduct, at a first point that is subsequent to the filling of the seal cavity with the control fluid, baseline ultrasonic imaging of the wellhead seal cavity to generate a baseline ultrasonic image that depicts a signature of the control fluid disposed in the wellhead seal cavity at the first point in time;

conduct an updated seal integrity test operation comprising:

conducting, at a second point in time that is subsequent to the first point in time, updated ultrasonic imaging of the wellhead seal cavity to generate an updated ultrasonic image that depicts a signature of substances disposed in the wellhead seal cavity at the second point in time;

compare the updated ultrasonic image to the baseline ultrasonic image to determine whether the integrity of the wellhead seal cavity has been compromised; and determine, based on the comparison of the updated ultrasonic image to the baseline ultrasonic image, that the integrity of the wellhead seal cavity has been compromised.

16. The medium of claim 15, wherein determining that the integrity of the wellhead seal cavity has been compromised comprises determining that the wellhead seal cavity comprises a substance other than the control fluid.

17. The medium of claim 15, the operations further comprising:

in response to determining that the wellhead seal cavity comprises a substance other than the control fluid, determining that the integrity of the wellhead seal cavity has been compromised; and operating, in response to determining that the integrity of the wellhead seal cavity has been compromised, the hydrocarbon well in accordance with the wellhead seal cavity being compromised.

18. The medium of claim 17, wherein operating the hydrocarbon well in accordance with the wellhead seal cavity being compromised comprises prompting a remediation operation to repair or replace the wellhead seal assembly, or wherein operating the hydrocarbon well in accordance with the wellhead seal cavity being compromised comprises modifying a production parameter of the hydrocarbon well.

19. The medium of claim 15, wherein the wellhead assembly comprises an ultrasonic transducer coupled to an exterior of a body of the wellhead, and wherein the ultrasonic imaging of the wellhead seal cavity comprises activating the ultrasonic transducer to generate an ultrasonic signal that is transmitted through the body of the wellhead and into the wellhead seal cavity.

20. The medium of claim 15, the operations further comprising:

conducting, at a third point in time that is subsequent to the first point in time and prior to the second point in time, second updated ultrasonic imaging of the wellhead seal cavity to generate a second updated ultrasonic image that depicts a signature of substances disposed in the wellhead seal cavity at the third point in time;

comparing the second updated ultrasonic image to the baseline ultrasonic image to determine whether the integrity of the wellhead seal cavity has been compromised at the third point in time; and determining, based on the comparison of the second updated ultrasonic image to the baseline ultrasonic image, that the integrity of the wellhead seal cavity has not been compromised at the third point in time.

* * * * *

UNITED STATES PATENT AND TRADEMARK OFFICE
CERTIFICATE OF CORRECTION

PATENT NO. : 11,795,815 B2  
APPLICATION NO. : 17/165006  
DATED : October 24, 2023  
INVENTOR(S) : Hashim et al.

Page 1 of 1

It is certified that error appears in the above-identified patent and that said Letters Patent is hereby corrected as shown below:

In the Claims

Column 16, Claim 1, Lines 9-10:
"the integrity of the wellhead seal assembly at a first point in time"
Should be changed to:
--the integrity of the wellhead seal assembly--;

Column 17, Claim 8, Line 9:
"conduct, at a first point that is subsequent to the filling"
Should be changed to:
--conduct, at a first point in time that is subsequent to the filling--; and Column 19, Claim 15, Line 6:
"conduct, at a first point that is subsequent to the filling of"
Should be changed to:
--conduct, at a first point in time that is subsequent to the filling of--.

Signed and Sealed this  
Twenty-eighth Day of November, 2023

Katherine Kelly Vidal  
*Director of the United States Patent and Trademark Office*